(12) United States Patent
Patil et al.

(10) Patent No.: US 8,598,102 B2
(45) Date of Patent: *Dec. 3, 2013

(54) LUBRICANT BASE STOCKS BASED ON BLOCK COPOLYMERS AND PROCESSES FOR MAKING

(75) Inventors: Abhimanyu Onkar Patil, Westfield, NJ (US); Margaret May-Som Wu, Skillman, NJ (US); Satish Bodige, Wayne, NJ (US); Man Kit Ng, Annandale, NJ (US)

(73) Assignee: ExxonMobil Research and Egineering Company, Annandale, NJ (US)

(*) Notice: Subject to any disclaimer, the term of this patent is extended or adjusted under 35 U.S.C. 154(b) by 346 days.

This patent is subject to a terminal disclaimer.

(21) Appl. No.: 12/974,564

(22) Filed: Dec. 21, 2010

(65) Prior Publication Data

US 2011/0160107 A1 Jun. 30, 2011

Related U.S. Application Data

(60) Provisional application No. 61/335,031, filed on Dec. 30, 2009.

(51) Int. Cl.
*C10M 145/24* (2006.01)
*C08G 65/26* (2006.01)

(52) U.S. Cl.
USPC .................... 508/579; 508/591; 525/185

(58) Field of Classification Search
USPC ................................... 508/579, 591
See application file for complete search history.

(56) References Cited

U.S. PATENT DOCUMENTS

| | | | |
|---|---|---|---|
| 3,149,178 A | 9/1964 | Hamilton et al. | |
| 3,382,291 A | 5/1968 | Brennan | |
| 3,475,395 A * | 10/1969 | Hsieh | 528/393 |
| 3,742,082 A | 6/1973 | Brennan | |
| 3,769,363 A | 10/1973 | Brennan | |
| 3,780,128 A | 12/1973 | Shubkin | |
| 3,876,720 A | 4/1975 | Heilman et al. | |
| 4,149,178 A | 4/1979 | Estes | |
| 4,172,855 A | 10/1979 | Shubkin | |
| 4,239,930 A | 12/1980 | Allphin et al. | |
| 4,367,352 A | 1/1983 | Watts, Jr. et al. | |
| 4,413,156 A | 11/1983 | Watts, Jr. et al. | |
| 4,434,408 A | 2/1984 | Baba et al. | |
| 4,568,663 A | 2/1986 | Mauldin | |
| 4,827,064 A | 5/1989 | Wu | |
| 4,827,073 A | 5/1989 | Wu | |
| 4,910,355 A | 3/1990 | Shubkin et al. | |
| 4,914,254 A | 4/1990 | Pelrine | |
| 4,926,004 A | 5/1990 | Pelrine et al. | |
| 4,956,122 A | 9/1990 | Watts et al. | |
| 4,967,032 A | 10/1990 | Ho | |
| 4,973,414 A | 11/1990 | Nerger et al. | |
| 5,068,487 A | 11/1991 | Theriot | |
| 5,348,982 A | 9/1994 | Herboltzheimer et al. | |
| 5,439,607 A | 8/1995 | Patil | |
| 5,545,674 A | 8/1996 | Behrmann et al. | |
| 5,741,946 A * | 4/1998 | Wei | 568/617 |
| 6,689,188 B2 * | 2/2004 | Luk et al. | 75/255 |
| 7,160,949 B2 * | 1/2007 | Ota et al. | 525/242 |
| 7,745,546 B2 * | 6/2010 | MacQueen et al. | 525/408 |
| 7,977,432 B2 * | 7/2011 | Bening et al. | 525/314 |
| 8,013,021 B2 * | 9/2011 | MacQueen et al. | 514/772.3 |
| 2003/0161752 A1 | 8/2003 | Luk et al. | |
| 2007/0265178 A1 | 11/2007 | Patil et al. | |
| 2008/0177121 A1 | 7/2008 | Wu et al. | |
| 2009/0247441 A1 | 10/2009 | Baum | |
| 2011/0098204 A1 * | 4/2011 | Patil et al. | 508/579 |
| 2012/0115763 A1 * | 5/2012 | Patil et al. | 508/556 |

* cited by examiner

*Primary Examiner* — Ellen McAvoy
(74) *Attorney, Agent, or Firm* — Robert A. Migliorini

(57) ABSTRACT

Provided is a block copolymer having an "A" block of a functionalized hydrocarbon moiety including one or more functional end groups selected from the group consisting of: epoxides, amines, acids, acid chlorides, acid anhydrides, halogens, vinyl or vinylidene double bond, aromatic rings and thiols, and a "B" block of a functionalized polyether moiety including one or more functional end groups selected from the group consisting: epoxides, amines, acids, acid chlorides, acid anhydrides, halogens, vinyl or vinylidene double bond, aromatic rings and thiols. The end group of the polyether moiety is different than the end group of the hydrocarbon moiety, and the hydrocarbon moiety and the polyether moiety are copolymerizable therewith. Preferably, the hydrocarbon moiety is a poly-α-olefin and the polyether moiety is a polyalkylene glycol.

20 Claims, No Drawings

LUBRICANT BASE STOCKS BASED ON BLOCK COPOLYMERS AND PROCESSES FOR MAKING

CROSS-REFERENCE TO RELATED APPLICATIONS

This application claims priority to U.S. Provisional Application Ser. No. 61/335,031 filed Dec. 30, 2009, herein incorporated by reference in its entirety.

FIELD

The present disclosure relates to a lubricant base stock that exhibits desirable performance attributes due to the polymerization of a hydrocarbon moiety (e.g., poly-α-olefins (PAO)) having terminal functional groups and a polyether moiety (e.g., polyalkylene glycols (PAG)) having terminal functional groups. The present disclosure further relates to a process for making the lubricant base stock. The present disclosure further relates to a lubricant formulation having the polymer therein.

BACKGROUND

Lubricant fuel/energy efficiency is a critical feature for future lubricants. In order to provide step-out fuel economy while maintaining or improving other performance features for lubricants, base stocks with lower friction coefficients are needed.

A useful lubricant base stock is the PAO class of fluids. PAOs are highly stable, versatile and compatible with a wide range of materials. PAOs have many advantages over conventional mineral oil or high-quality Group III or Group III+ lubricants. More specifically, PAOs have superior viscosity index (VI), low temperature properties (CCS (crankcase simulation), MRV (mini-rotary viscometer), and the like), low pour points, good additive response and complete miscibility with conventional mineral oil. PAOs are considered by the industry to be the best of hydrocarbon-type lubricants.

Another useful lubricant base stock is the PAG class of fluids. Advantages of PAG fluids include high VI, good lubricity (in hydrodynamic, mix, and boundary lubrication conditions) and excellent cleanliness. PAG fluids have numerous drawbacks. PAG fluids are not miscible or compatible with conventional mineral or hydrocarbon-based lubricants. PAGs are polar and have very low friction/traction for energy efficiency. PAG fluids are water-soluble, which results in severe corrosion problem. Some PAG fluids also have paint and/or seal compatibility problem.

SUMMARY

A block copolymer, comprising:
an "A" block of a functionalized hydrocarbon moiety including one or more functional end groups selected from the group consisting of: epoxides, amines, acids, acid chlorides, acid anhydrides, halogens, vinyl or vinylidene double bonds, aromatic rings and thiols; and
a "B" block of a functionalized polyether moiety including one or more functional end groups selected from the group consisting of: epoxides, amines, acids, acid chlorides, acid anhydrides, halogens, vinyl or vinylidene double bonds, aromatic rings and thiols,
wherein the end group of the polyether moiety is different than the end group of the hydrocarbon moiety, wherein the hydrocarbon moiety and the polyether moiety are copolymerizable therewith.

Preferably, hydrocarbon moiety is a poly-α-olefin, alkyl glycidyl ether, an Armin amine or dioctylamine and the polyether moiety is a polyalkylene glycol. The polyalkylene glycol is difunctional and the poly-α-olefin is difunctional. Preferably, the polyalkylene glycol is a difunctional amine and the poly-α-olefin is a monofunctional epoxide. The polyalkylene glycol is a Jeffamine® selected from the group consisting of: poly(propyleneglycol) bis(2-aminopropylether) (mw 230), and poly(propyleneglycol) bis(2-aminopropylether) (mw 400).

The copolymer is optionally a diblock copolymer or repeating diblock copolymer.

The copolymer has an average molecular weight of about 200 to about 7000, preferably between about 250 to about 5000.

The present disclosure also includes a synthetic base stock composition comprising: a macromolecular fluid comprising:
a hydrocarbon moiety having an average molecular weight within the range between about 200 to 7000, the moiety A comprising an alkyl or alkylene chain; and
a polyether moiety having an average molecular weight within the range between about 200 to about 7000,
wherein the hydrocarbon moiety provides hydrocarbon solubility to the macromolecular fluid and the polyether moiety imparts low friction coefficient to the material and wherein the hydrocarbon moiety and the polyether moiety are either linked to a bond other than a carbon to carbon bond or linked by a functional group so that the resultant macromolecular fluid is substantially amorphous, has a viscosity index of greater than 80, and a pour point of less than −20° C.

The present disclosure also includes a lubricant formulation, comprising: a first lubricant base stock comprising a block copolymer, the block copolymer comprising: an "A" block of a functionalized hydrocarbon moiety including one or more functional end groups selected from the group consisting of: epoxides, amines, acids, acid chlorides, acid anhydrides, halogens, vinyl or vinylidene double bonds, aromatic rings and thiols; and a "B" block of a functionalized polyether moiety including one or more functional end groups selected from the group consisting of: epoxides, amines, acids, acid chlorides, acid anhydrides, halogens, vinyl or vinylidene double bonds, aromatic rings and thiols, wherein the end group of the polyether moiety is different than the end group of the hydrocarbon moiety, wherein the hydrocarbon moiety and the polyether moiety are copolymerizable therewith; and a second lubricant base stock different than the first base stock. Preferably, the second base stock is selected from the group consisting of: metallocene poly-α-olefins, poly-α-olefins, a GTL (gas-to-liquids materials), a Group I base stock, a Group II based stock, and a Group III base stock.

DETAILED DESCRIPTION

All numerical values within the detailed description and the claims herein are modified by "about" or "approximately" the indicated value, and take into account experimental error and variations that would be expected by a person having ordinary skill in the art.

The lubricant of the present disclosure may have Group I-III oils as second base stocks. Useful Group I-III base stocks have a $Kv_{100}$ (kinetic viscosity) of greater than about 3 cSt to about 5 cSt. API Groups I, II, and III represent base stocks typically refined from crude oil and are differentiated by viscosity index (VI), saturation content, and sulfur content.

The specifications for the lube base oils are defined in the API Interchange Guidelines (API Publication 1509) using sulfur content, saturates content, and viscosity index, as follows:

| Group | Sulfur (ppm) | Saturates (%) | Viscosity Index (VI) |
|---|---|---|---|
| I | >300 | <90 | 80-120 |
| II | <300 | >90 | 80-120 |
| III | <300 | >90 | >120 |
| IV | All Polyalphaolefins (PAOs) | | |
| V | All Stocks Not Included in Groups I-IV | | |

PAOs are a class of hydrocarbons that can be manufactured by the catalytic oligomerization (polymerization to low-molecular-weight products) of linear α-olefin (LAO) monomers. These typically range from 1-octene to 1-dodecene, with 1-decene being a preferred material, although oligomeric copolymers of lower olefins such as ethylene and propylene may also be used, including copolymers of ethylene with higher olefins as described in U.S. Pat. No. 4,956,122 and the patents referred to therein, all of which are incorporated by reference in their entireties. PAO products have achieved importance in the lubricating oil market. Typically there are two classes of synthetic hydrocarbon fluids (SHF) produced from linear alpha-olefins, the two classes of SHF being denoted as PAO and HVI-PAO (high viscosity index PAO's). PAO's of different viscosity grades are typically produced using promoted $BF_3$ or $AlCl_3$ catalysts.

Specifically, PAOs may be produced by the polymerization of olefin feed in the presence of a catalyst, such as $AlCl_3$, $BF_3$, or promoted $AlCl_3$ or $BF_3$. Processes for the production of PAOs are disclosed, for example, in the following patents: U.S. Pat. Nos. 3,149,178; 3,382,291; 3,742,082; 3,769,363; 3,780,128; 4,172,855 and 4,956,122, which are fully incorporated herein by reference. PAOs are also discussed in the following: Will, J. G. *Lubrication Fundamentals*, Marcel Dekker: New York, 1980. Subsequent to polymerization, the PAO lubricant range products are typically hydrogenated in order to reduce the residual unsaturation, generally to a level of greater than 90% of hydrogenation. High viscosity PAO's may be conveniently made by the polymerization of an alpha-olefin in the presence of a polymerization catalyst such as Friedel-Crafts catalysts. These include, for example, boron trifluoride, aluminum trichloride, or boron trifluoride, promoted with water, with alcohols such as ethanol, propanol, or butanol, with carboxylic acids, or with esters such as ethyl acetate or ethyl propionate or ether such as diethyl ether, and diisopropyl ether. (See for example, the methods disclosed by U.S. Pat. Nos. 4,149,178 and 3,382,291.) Other descriptions of PAO synthesis are found in the following: U.S. Pat. No. 3,742,082; U.S. Pat. No. 3,769,363; U.S. Pat. No. 3,876,720; U.S. Pat. No. 4,239,930; U.S. Pat. No. 4,367,352; U.S. Pat. No. 4,413,156; U.S. Pat. No. 4,434,408; U.S. Pat. No. 4,910,355; U.S. Pat. No. 4,956,122; and U.S. Pat. No. 5,068,487, all of which are incorporated in their entirety herein by reference.

Another class of HVI-PAOs may be prepared by the action of a supported, reduced chromium catalyst with an alpha-olefin monomer. Such PAOs are described in U.S. Pat. No. 4,827,073; U.S. Pat. No. 4,827,064; U.S. Pat. No. 4,967,032; U.S. Pat. No. 4,926,004; and U.S. Pat. No. 4,914,254. Commercially available PAOs include SpectraSyn™ 2, 4, 5, 6, 8, 10, 40, 100 and SpectraSyn Ultra™ 150, SpectraSyn Ultra™ 300, SpectraSyn Ultra™ 1000, etc. (ExxonMobil Chemical Company, Houston, Tex.). Also included are PAOs prepared the presence of a metallocene catalyst with a non-coordinating anion activator and hydrogen as discussed in U.S. Published Patent Application No. 20080177121.

Other important lube base stocks are those derived from one or more Gas-to-Liquids materials (GTLs). GTL materials that are derived via one or more synthesis, combination, transformation, rearrangement, and/or degradation/deconstructive processes from gaseous carbon-containing compounds. GTLs are disclosed as lube base stocks, for example, in U.S. Published Application No. 2007/0265178, which is incorporated herein by reference.

Other important lube base stocks are the Groups I, II, and III base stocks. Groups I, II, and III base stocks are disclosed in "Synthetics, Mineral Oils and Bio-Based Lubricants, Chemistry and Technology" Edited by L. R. Rudnick, published by CRC Press, Taylor & Francis, 2005, which is incorporated herein by reference.

GTL base oils comprise base stocks obtained from GTL materials that are derived via one or more synthesis, combination, transformation, rearrangement, and/or degradation/deconstructive processes from gaseous carbon-containing compounds. Preferably, the GTL base stocks are derived from the Fischer-Tropsch (FT) synthesis process wherein a synthesis gas comprising a mixture of $H_2$ and CO is catalytically converted to lower boiling materials by hydroisomerization and/or dewaxing. The process is described, for example, in U.S. Pat. Nos. 5,348,982 and 5,545,674, and examples of suitable catalysts are described in U.S. Pat. No. 4,568,663, each of which is incorporated herein by reference.

GTL base stocks are characterized typically as having kinematic viscosities at 100° C. of from about 2 cSt to about 50 cSt, preferably from about 3 cSt to about 50 cSt, more preferably from about 3.5 cSt to about 30 cSt. The GTL base stock and/or other hydrodewaxed, or hydroisomerized/catalytically (or solvent) dewaxed wax derived base stocks used in the present disclosure have kinematic viscosities at 100° C. in the range of about 3.5 cSt to 7 cSt, preferably about 4 cSt to about 7 cSt, more preferably about 4.5 cSt to 6.5 cSt.

The lubricant of the present disclosure may have Group I-III oils as second base stocks. Useful Group I-III base stocks have a $Kv_{100}$ (kinetic viscosity) of greater than about 3 cSt to about 5 cSt. API Groups I, II, and III represent base stocks typically refined from crude oil and are differentiated by viscosity index (VI), saturation content, and sulfur content.

The specifications for the lube base oils are defined in the API Interchange Guidelines (API Publication 1509) using sulfur content, saturates content, and viscosity index, as follows:

| Group | Sulfur (ppm) | Saturates (%) | Viscosity Index (VI) |
|---|---|---|---|
| I | >300 | <90 | 80-120 |
| II | <300 | >90 | 80-120 |
| III | <300 | >90 | >120 |
| IV | All Polyalphaolefins (PAOs) | | |
| V | All Stocks Not Included in Groups I-IV | | |

Manufacturing plants that make Group I base oils typically use solvents to extract the lower viscosity index (VI) components and increase the VI of the crude to the specifications desired. These solvents are typically phenol or furfural. Solvent extraction gives a product with less than 90% saturates and more than 300 ppm sulfur. The majority of the lube production in the world is in the Group I category.

Manufacturing plants that make Group II base oils typically employ hydroprocessing such as hydrocracking or severe hydrotreating to increase the VI of the crude oil to the specifications value. The use of hydroprocessing typically increases the saturate content above 90 and reduced the sulfur below 300 ppm. Approximately 10% of the lube base oil production in the world is in the Group II category, and about 30% of U.S. production is Group II.

Manufacturing plants that make Group III base oils typically employ wax isomerization technology to make very high VI products. Since the starting feed is waxy vacuum gas oil (VGO) or wax which contains all saturates and little sulfur, the Group III products have saturate contains above 90 and sulfur content below 300 ppm.

A process for making a block copolymer, comprising: copolymerizing a functionalized hydrocarbon moiety and a functionalized polyether moiety, wherein the functionalized hydrocarbon moiety includes one or more functional end groups selected from the group consisting of: epoxides, amines, acids, acid chlorides, acid anhydrides, halogens, vinyl or vinylidene double bonds, aromatic rings and thiols, and wherein the functionalized polyether moiety includes one or more functional end groups selected from the group consisting of: epoxides, amines, acids, acid chlorides, acid anhydrides, halogens, vinyl or vinylidene double bonds, aromatic rings and thiols, wherein the end group of the polyether moiety is different than the end group of the hydrocarbon moiety, and wherein the hydrocarbon moiety and the polyether moiety are copolymerizable therewith.

Preferably, the copolymerization takes place at a temperature of about 0° C. to about 200° C., more preferably between about 20° C. to about 120° C. The copolymerization takes place for a time of about 0.5 h to about 36 h, more preferably between about 1 h to about 24 h.

A lubricant base stock that exhibits desirable performance attributes due to the polymerization of a hydrocarbon moiety (e.g., poly-α-olefins (PAO)) having one or more functional end groups and a polyether moiety (e.g., polyalkylene glycols (PAG)) having one or more functional end groups. More particular, chemically coupled PAO-PAG block polymers of a hydrocarbon segment, such as those of poly-α-olefin (PAO), and a polyether segment, such as poly(alkylene glycol) (PAG), can be employed as low molecular weight synthetic lubricant base stocks.

The hydrocarbon segment can be a long chain alkane, a poly-α-olefin or a low molecular weight polyethylene, propylene or ethylene-α-olefin macromer. The macromer is a unit having between about 16 to about 40 carbon atoms derived from ethylene, propylene or α-olefins, and combinations of the foregoing. The olefin monomeric units are derived from one or more internal olefins. Alternatively, the olefin monomeric units are derived from one or more olefins including 1-hexene, 1-octene, 1-nonene, 1-decene, 1-undecene, 1-dodecene, 1-tetradecene, 1-hexadecene or 1-octadecene. Still further, the olefin monomeric unit is a low molecular weight oligomer prepared via a metallocene catalytic reaction. The low molecular weight oligomer is a dimer of 1-decene, 1-decene, 1-hexene, 1-tetradecene or mixtures thereof.

The polyether segment can be a polyalkylene glycol, such as ethylene glycol, propylene glycol, polybutylene glycol, or combinations thereof.

These segments are preferably coupled by chemical reaction of functional groups that can be attached to either the hydrocarbon segment and/or the polyether segment. Preferred schemes of coupling reactions are depicted below:

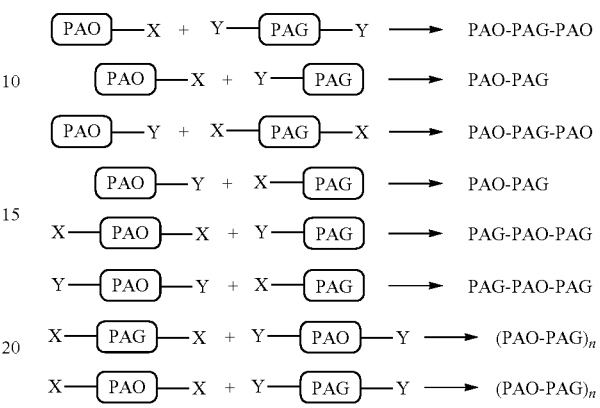

wherein X and Y are functional groups, such as amines, epoxides, acids, acid halides, halides, alcohols, esters, ketones, vinyl or vinylidene double bonds, substituted aromatic groups, phenols, and thiols.

As one example, the PAO/PAG block copolymers substantially maintain the respective benefits of both PAG and PAO fluids while eliminating or diminishing their respective disadvantages. Notably, the block copolymers provide superior step-out fuel economy and energy efficiency when used in automotive engine lubricants and industrial and grease lubricants.

Three reaction sequences are particularly preferred in making the PAO-PAG block copolymers.

The first preferred sequence is the reaction of an alkyl glycidyl ether with a Jeffamine® to obtain a PAO-PAG block copolymer fluid.

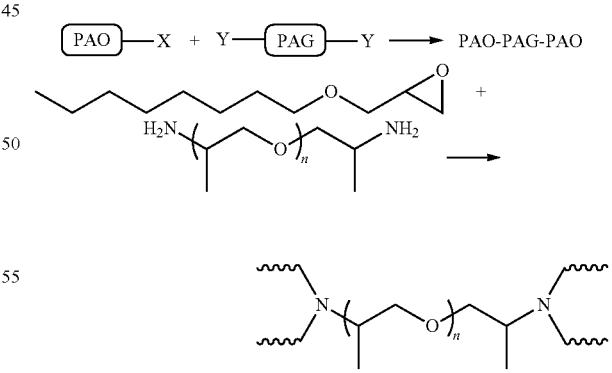

The PAO in above reaction is a $C_8/C_{10}$ alkyl glycidyl ether wherein X is an epoxide and PAG is an polyether amine (Jeffamine®) wherein Y is an amine.

The second preferred sequence is the reaction of an alkyl epoxide ($C_{20}$-epoxy) with a Jeffamine® to obtain a PAO-PAG block copolymer fluid.

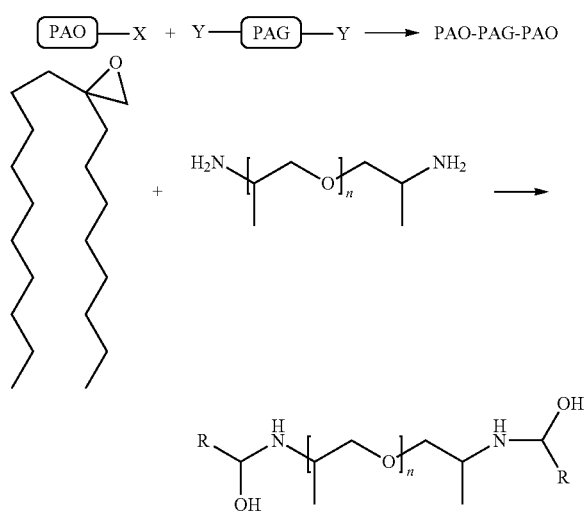

The PAO-PAG shown above is similar to the structure depicted in the first sequence except the PAO is a long chain alkyl group (rather than a glycidyl ether) wherein X is an epoxide group and PAG is a polyether amine (Jeffamine®) wherein Y is an amine group.

The third preferred sequence is the reaction of a poly(alkylene glycol) diglycidyl ether with an alkylamine to obtain a PAO-PAG fluid.

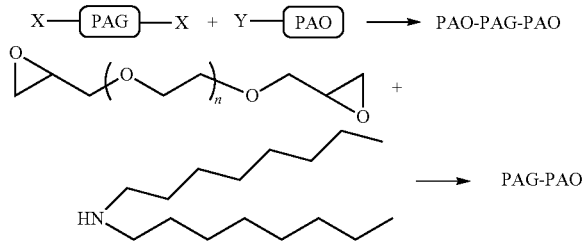

The PAO/PAG block copolymer shown above has a diepoxide as a part of the polyether segment (PAG) and an amine as a part of hydrocarbon (PAO) segment, wherein X is an epoxide group and Y is an amine group.

Polyethylene glycol-containing diepoxides with dioctylamine can be reacted to obtain a low molecular weight synthetic fluid. For example, poly(ethyleneglycol) diglycidyl ether (MW of 526) and dioctylamine can be reacted to obtain a liquid product that has excellent lube properties like PAO. Besides poly(ethyleneglycol) diglycidyl ether, other diepoxides that contain polyether segments can be reacted with amines. Further, Armeen amines other than dioctylamine can be reacted with epoxides.

Epoxides can be prepared by epoxidation of unhydrogenated PAO (PAO with terminal double bond) or of other hydrocarbon macromers, such as polyethylene (PE), polypropylene (PP), ethylene propylene (EP), ethylene butylene (EB), polyisobutylene (PIB), poly-n-butylene (PNB) macromers, or of alkyl glycidyl ethers.

The macromer is a having between about 16 to about 40 carbon atoms derived from ethylene, propylene, or α-olefins, and combinations of the foregoing. The olefin monomeric units are derived from one or more internal olefins. Alternatively, the olefin monomeric units are derived from one or more olefins including 1-hexene, 1-octene, 1-nonene, 1-decene, 1-undecene, 1-dodecene, 1-tetradecene, or 1-octadecene. Still further, the olefin monomeric unit is a low molecular weight oligomer prepared via a metallocene catalytic reaction. The low molecular weight oligomer is a dimer of 1-decene, 1-decene, 1-hexene, 1-tetradecene or mixtures thereof.

Olefins are epoxidized using an epoxidation catalyst to produce a terminally epoxidized macromer. Epoxidation of the present olefin materials can be affected using a peracid, such as performic acid, perbenzoic acid or m-chloroperbenzoic acid, as the oxidizing agent. The oxidation reaction can be performed using a preformed peracid to affect the epoxidation, or the peracid can be generated in-situ, for example by the addition of formic acid and hydrogen peroxide to produce performic acid. Formic acid can be added in a molar ratio to the olefin double bonds of from about 10:1 to about 30:1. Hydrogen peroxide can be added to the reaction mixture in a molar ratio to the olefin double bonds of from about 1.01:1 to about 5:1. Addition of both formic acid and $H_2O_2$ to the reaction mixture results in the in situ formation of performic acid as an epoxidizing agent. Typically, the epoxidation is conducted at a temperature ranging from about 25° C. to about 100° C., preferably from about 30° C. to about 70° C. Suitable reaction times will generally range from about 0.1 hour to about 36 hours, such as from about 1 hour to about 24 hours. Epoxidation reactions can provide conversion from about 50 to about 100% of the double bonds into oxirane groups.

The epoxidation reaction is generally carried out in a liquid reaction medium. The reaction medium can comprise only the reactants essentially utilized in the process. More conventionally, however, the liquid reaction medium will comprise a suitable reaction solvent in which the reactants and catalyst materials can be dissolved, suspended or dispersed. Suitable reaction solvents include organic liquids which are inert in the reaction mixture. By "inert" is meant that the solvent does not deleteriously affect the oxidation reaction. Suitable inert organic solvents include aromatic hydrocarbons such as benzene, toluene, xylenes, benzonitrile, nitrobenzene, anisole, and phenyl nonane; saturated aliphatic hydrocarbons having from about 5 to about 20 carbons, such as pentane, hexane, and heptane; adiponitrile; halogenated hydrocarbons such as methylene chloride, 1,2-dichloroethane, chloroform, carbon tetrachloride and the like; non-fluorinated, substituted saturated aliphatic and/or aromatic hydrocarbons having from about 1 to about 20 carbons, including those selected from the group consisting of alcohols such as methanol, propanol, butanol, isopropanol, and 2,4-di-t-butylphenol; ketones such as acetone; carboxylic acids such as propanoic acid and acetic acid; esters such as ethyl acetate, ethyl benzoate, dimethyl succinate, butyl acetate, tri-n-butyl phosphate, and dimethyl phthalate; ethers, such as tetraglyme; and mixtures thereof.

One type of epoxidation of olefins involves reaction of the material with a peracid, such as performic acid or m-chloroperbenzoic acid, to provide an epoxidized material having oxirane rings formed at the sites of the residual double bonds within the molecule. Catalytic epoxidation alternatives using hydrogen peroxide as an oxidizing agent instead of peracids can be used to epoxidize some unsaturated materials. Catalysts based on the use of high valent (do), mostly Ti, V, Mo, W, and Re, metal complexes are known to promote alkene epoxidation with $H_2O_2$. Some notable effective epoxidation catalysts for use with hydrogen peroxide include titanium silicates, peroxophosphotungstates, manganese triazocyclononane, and methylrhenium trioxide.

A poly-α-olefin-polyalkyleneglycol (PAO-PAG) type fluid can be synthesized from a reaction of an alkyl epoxide ($C_{20}$- epoxy) with a polyether amine. Polyether amines, such as the Jeffamines®, can be reacted with an epoxide terminated hydrocarbon molecule (PAO or C$_{20}$-epoxy) to obtain a low molecular weight synthetic fluid that can be used as synthetic base stock.

The Jeffamines® can be amine-terminated polyethers. The reaction of amine-terminated polyethers and epoxides can be carried out neat or in solvents like THF, MEK or ethanol. The temperature of the reaction can be 25° C. to 60° C. or higher. The reaction time can be a few hours to few days.

The Jeffamines® can be amine-terminated polyethers such as polyethylene oxide (PEO), polypropylene oxide (PPO) or combination of PEO/PPO copolymers. For example, some of the commercial polyethers include: poly(ethyleneglycol) bis (3-aminopropylether) (34901-14-9, mw 1500), poly(propyleneglycol) bis(2-aminopropylether) (mw 230), poly(propyleneglycol) bis(2-aminopropylether) (mw 400), poly (propyleneglycol) bis(2-aminopropylether) (9046-10-0, mw 2000), poly(propyleneglycol) bis(2-aminopropylether) (mw 4000), poly(propyleneglycol)-block-poly(ethyleneglycol)-block poly(propyleneglycol) bis(2-aminopropylether) (65605-36-9) (3.5:8.5) (PO:EO) (mw 600), poly(propyleneglycol)-block-poly(ethyleneglycol)-block poly(propyleneglycol) bis(2-aminopropylether) (3.5:15.5) (PO:EO) (mw 900), poly(propyleneglycol)-block-poly(ethyleneglycol)-block poly(propyleneglycol) bis(2-aminopropylether) (3.5:40.5) (PO:EO) (mw 2000), glycerol tris[poly(propylene glycol), amine terminated] ether (64852-22-8, mw 3000 or mw 440), poly(tetrahydrofuran), bis(3-aminopropyl) terminated (72088-96-1), and the like.

The chemical structures of examples of amine-terminated polyethers are shown below:

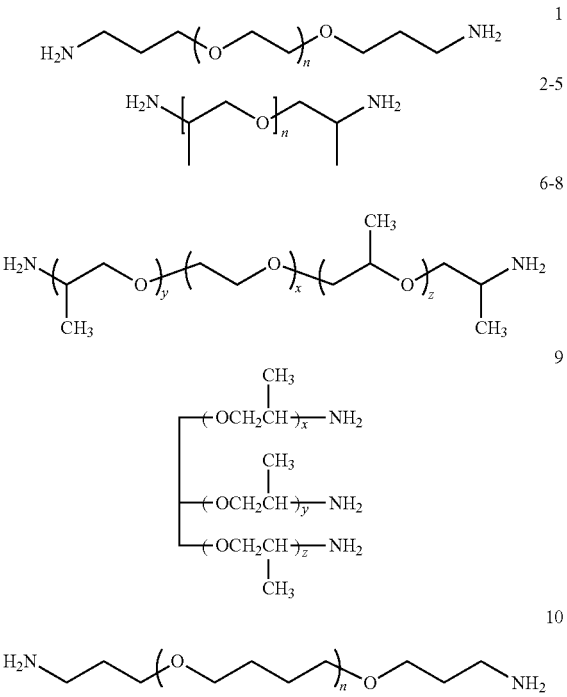

Jeffamines® can be monoamines that are prepared by reaction of a monohydric alcohol initiator with ethylene and/or propylene oxide, followed by conversion of the resulting terminal hydroxyl group to an amine. These products are produced by Huntsman as Jeffamine® monoamines (M series).

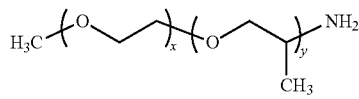

The molecular weights of the product can be 600, 1000, etc.

In this case, the sequence is the reaction of an alkyl epoxide or alkyl diepoxide with monoamine polyether to obtain a PAO-PAG fluid.

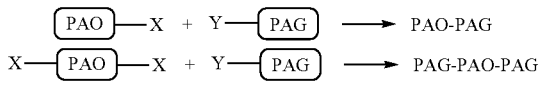

The reaction of amine-terminated polyethers and epoxides can be carried out neat or in solvents like THF, MEK or ethanol. The temperature of the reaction can be 25° C. to 60° C. or higher. The reaction time can be a few hours to few days.

The chemically coupled macromolecules of the present disclosure is useful as a lubricant base stock or a functional fluid and preferably has a 100° C. kinematic viscosity of about 1.5 cSt to about 3000 cSt according to the ASTM D445 method. The copolymer has a 40° C. kinematic viscosity of about 3 to about 15000 cSt. Preferred polymers exhibit a high viscosity index (VI). The VI typically ranges from about 70 to about 300 depending on viscosity, amount of hydrocarbon segment units, amount of alkylene oxide units, type of hydrocarbon segment or alkylene oxide units, method of synthesis, chemical compositions, and the like. Pour points are generally below −5° C. even in the case of the higher molecular weight oligomers with viscosities (100° C.) of 20 cSt or higher. Pour points (ASTM D97 or equivalent) generally range between −20 and −55° C. and usually below −25° C. Product viscosity may vary in view of factors such as polymerization conditions reaction temperature and reaction time. The lubricant fraction of the product will typically be a material having a viscosity between about 4 cSt to about 3000 cSt (at 100° C.), but lower viscosity products between about 1.5 cSt to about 40 cSt (at 100° C.) may also be obtained for use in lubricants in which a low viscosity base stock is desired.

The molecular weight of the polymer typically ranges from about 200 to about 20,000, typically from about 300 to about 10,000, and most typically from about 350 to about 7,500. Higher molecular weights and corresponding viscosities may be achieved by suitable choice of starting hydrocarbon segment, polyether segment and number of functional groups and reaction conditions. Values of the polydispersity index (PDI) are typically from about 1.5 to about 3.0.

The polymer can take the form of a block copolymer or multi-blocks or dendritic or star type or combination of those. The polymer optionally may contain minor amounts of unreacted hydrocarbon segment or polyether segment as long as a homogeneous mixture can be obtained.

For automotive engine lubricant formulations, it is generally preferred to have lower viscosity fluids, e.g., below 10 cSt. Lower viscosity is known to impart lower viscous drag thus offering better energy efficiency or fuel economy. Both low viscosity and high viscosity fluids are useful in industrial lubricant formulations to yield different ISO vis grad lubricants. For industrial lubricant formulations, it is generally important to use fluids of high VI and high hydrolytic stability.

For both engine and industrial lubricant application, it is important to have a lubricant formulation with a low friction coefficient. Fluids with low friction coefficients exhibit low frictional loss during lubrication. Low frictional loss is critical for improved energy or fuel efficiency of formulated lubricants.

Friction coefficients can be measured by a High Frequency Reciprocating Rig (HFRR) test. The test equipment and procedure are similar to the ASTM D6079 method except the test oil temperature is raised from 32° C. to 195° C. at 2° C./minute, 400 g load, 60 Hz frequency. The test can measure average friction coefficient and wear volume.

The PAO-PAG copolymers may take any form of block copolymer, such as diblock, repeating block, and the like.

Other teachings to useful PAO and PAG fluids and processes for making are disclosed in *Synthetics, Mineral Oils, and Bio-Based Lubricants, Chemistry and Technology*, by L. R. Rudnick, CRC Press, © 2006.

PAO-PAG fluids formed by combining a PAO type structure with a PAG structure maintain the benefits of both PAO (good VI, PP, and miscibility) and PAG (low friction coefficient) fluids. The fluids are very good lubricant base stocks. The fluids are soluble in hydrocarbon fluids. Thus, these fluids can be used along with other base stocks, such as poly-α-olefins, Group III+ type fluids (Visom, GTL, etc) and Group I-III base stocks.

The following are examples of the present disclosure and are not to be construed as limiting.

EXAMPLES

PAO-PAG block copolymer fluids were synthesized via processes according to the present disclosure.

Example 1

The Synthesis of Polyether-Containing Epoxy-Amine Polymer from Alkyl ($C_8$-$C_{10}$) Glycidyl Ether and Jeffamine® D-230

A mixture of octyl/decyl glycidyl ether (31.35 g, 0.125 mol), Jeffamine® D-230 (6.00 grams, 0.026 mol) and absolute ethanol (60 ml) was heated in a 500 ml round-bottomed flask at reflux for 30 hours. The yellow solution was cooled to room temperature, concentrated on a rotary evaporator followed by heating in an air bath oven at 160° C. to 170° C. under vacuum to remove excess octyl/decyl glycidyl ether. The yield of yellow oil product was 25.5 grams (95%). The product IR and NMR analysis suggests the formation of tetra amino alcohol of octyl/decyl glycidyl ether and Jeffamine® D-230. $^1$H NMR δ (CDCl$_3$) 0.87 (CH$_3$, t), 1.12 (br), 1.26 (CH$_2$, m), 2.60-2.80 (CH$_2$, m) 3.36-3.68 (—CH$_2$—O, CH—O, m).

Lube Properties of Base Stock

The kinematic viscosity (Kv) of the liquid product was measured using ASTM standard D-445 and reported at temperatures of 100° C. (Kv at 100° C.) or 40° C. (Kv at 40° C.). The viscosity index (VI) was measured according to ASTM standard D-2270 using the measured kinematic viscosities for each product. The viscosity of the product at 100° C. was 14.23 cSt, and 149.96 cSt at 40° C. with a viscosity index (VI) of 91. The pour point of the product was −39° C. The data were compared with PAO 10 as a control. The viscometric data of the product suggest that the fluid has excellent lubricant properties that are comparable to PAO. Results are set forth in Table 1 below. PAO 10 is ExxonMobil Chemical SpectraSyn™ Polyalphaolefin (PAO).

TABLE 1

(Lube Properties of Base Stocks of Example 1 and Control)

| Sample # | $Kv_{100}$ | $Kv_{40}$ | Viscosity Index (VI) | Pour Point (° C.) |
|---|---|---|---|---|
| Example 1 | 14.23 | 149.96 | 91 | −39 |
| PAO10 | 10 | 66 | 137 | −48 |

Friction Coefficients of Base Stock

Lubricant fuel/energy efficiency has been identified as a critical feature for premium lubricants. In order to provide step-out fuel economy while maintaining or improving other performance features for lubricants, base stocks with lower friction coefficients are needed. The friction coefficient of the product base stock was measured using the HFRR (high frequency reciprocating rig) test. The friction coefficient of the product was 0.1, while the friction coefficient of 10 cSt PAO under same measurement conditions was 0.13. This difference in friction coefficient reflects the energy efficiency of the base stock. Results are set forth in Table 2 below.

TABLE 2

(The Friction Coefficients of Base Stocks of Example 1 and Control)

| Sample # | Friction Coefficient (FC) |
|---|---|
| Example 1 | 0.10 |
| PAO 10 | 0.13 |

Blending Studies

Example 2

The Blending Studies of Jeffamine® (D-230)-Glycidyl Ether ($C_8$-$C_{10}$) of Example 1 with PAO4 and Control

TABLE 3

(Blending Studies of the Product of Example 1 and PAO4 Base Stock)

| | Product Example 1 | Product Ex. 1: PAO4 | Product Ex. 1: PAO4 | Product Ex. 1: PAO4 | Product Ex. 1: PAO4 | PAO4 |
|---|---|---|---|---|---|---|
| Blend Composition | 100 | 50 | 20 | 10 | 5 | 100 |
| Kv100 cSt | 14.23 | 6.07 | 4.84 | 4.43 | 4.26 | 4.1 |
| Kv40 cSt | 149.96 | 35.67 | 24.51 | 20.81 | 19.61 | 19 |
| VI | 91 | 116 | 121 | 125 | 125 | 126 |
| PP (° C.) | −39 | | | | | −66 |
| Avg FC | 0.098 | 0.122 | 0.122 | 0.126 | 0.127 | 0.21 |

Example 3

Synthesis of Polyether-Containing Epoxy-Amine Polymer from Dodecyl/Tetradecyl Glycidyl Ether and Jeffamine® D-230

Dodecyl/tetradecyl glycidyl ether (61.5 grams, 0.205 mol) and Jeffamine® D-230 (11.5 grams, 0.05 mol) were charged to a 500 ml round-bottom flask with 50 ml of ethanol. The reaction mixture refluxed overnight with stirring. After cooling, the low boiling ethanol was removed with a rotary evaporator and the high boiling excess of dodecyl/tetradecyl glycidyl ether was removed with an air bath oven at 160° C. to 170° C. under vacuum. The final colorless product yield was 70 grams (96%). The product IR and NMR analysis suggest the formation of a tetra amino alcohol of dodecyl/tetradecyl glycidyl ether and Jeffamine® D-230. IR: (cm$^{-1}$) 3463, 2922, 1458, 1369, 1115, 720 NMR: $^1$H NMR δ (CDCl$_3$) 0.874 (CH$_3$, s), 0.976 (CH$_3$, s) 1.265 (—CH$_2$—, m), 2.587 (CH$_2$, s) 3.439-3.592 (—CH$_2$—O, CH—O, m), 3.79 (OH, s).

Lube Properties of Base Stock

The viscosity of the product at 100° C. was 17.7 cSt and at 40° C. was 181.6 cSt with a viscosity index (VI) of 106. The pour point of the product was −6° C. The data was compared with PAO 10 (control) and are set forth in Table 4 below. The viscometric data of the product suggests that the fluid has good lubricant properties that are comparable to PAO.

TABLE 4

(Lube Properties of Base Stocks of Example 3 and Control)

| Sample # | Kv$_{100}$ | Kv$_{40}$ | Viscosity Index (VI) | Pour Point (° C.) |
|---|---|---|---|---|
| Example 3 | 17.7 | 181.6 | 106 | −6 |
| PAO10 | 10 | 66 | 137 | −48 |

Friction Coefficients of Base Stock

The friction coefficient of the product base stock was measured using a HFRR (high frequency reciprocating rig) test. The friction coefficient of the product was 0.068, while the friction coefficient of the 10 cSt PAO under same measurement conditions was 0.13. This difference in friction coefficient reflects the energy efficiency of the base stock.

TABLE 5

(Friction Coefficient of Base Stocks of Example 3 and Control)

| Example # | Friction Coefficient (FC) |
|---|---|
| Example 3 | 0.068 |
| PAO 10 | 0.13 |

Example 4

Blending Studies of Jeffamine® (D-230)-Glycidyl Ether (C$_{12}$-C$_{14}$) of Example 3 with PAO4

TABLE 6

(Blending Studies of the Product of Example 3 with PAO4 Base Stock)

| | Product Example 3 | Product Ex. 3: PAO4 | Product Ex. 3: PAO4 | Product Ex. 3: PAO4 | PAO4 |
|---|---|---|---|---|---|
| Blend Composition | 100 | 50 | 10 | 5 | 100 |
| Kv100 cSt | 17.7 | 7.8 | 4.6 | 4.3 | 4.1 |
| Kv40 cSt | 181.6 | 49.4 | 21.5 | 19.7 | 19 |
| VI | 106 | 126 | 133 | 129 | 126 |

Polyether-Containing Epoxy-Amine Polymer from Alkyl (C$_8$-C$_{10}$) Glycidyl Ether and Jeffamines®

Example 5

Synthesis of Polyether-Containing Epoxy-Amine Polymer from C$_8$/C$_{10}$ Glycidyl Ether and Polytetrahydrofurane bis (3-aminopropyl) Terminated

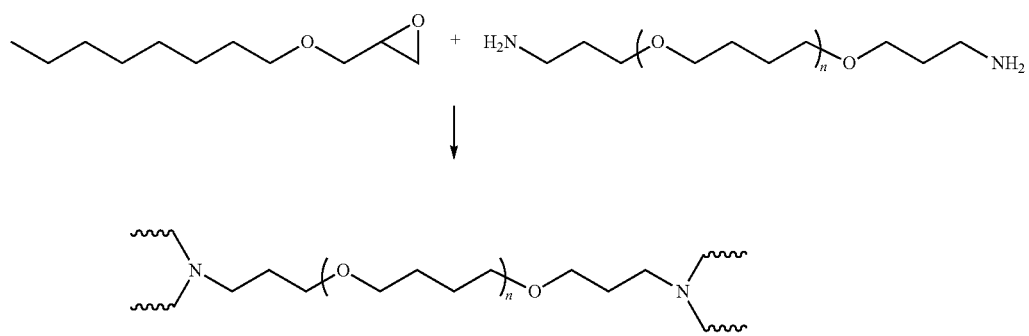

Octyl/decyl glycidyl ether (41 grams, 0.1025 mol) and polytetrahydrofurane bis(3-aminopropyl) terminated (mw ~350, 8.75 grams, 0.025 mol) were charged in a 300 ml round bottom flask with 25 ml of ethanol. The reaction mixture was refluxed overnight with stirring. After cooling, the low boiling ethanol was removed with a rotary evaporator and the high boiling excess of ocyl/decyl glycidyl ether was removed with an air bath oven at 180° C. under vacuum. The final colorless product yield was 38 grams (79%). The product IR analysis suggests the formation of a tetra amino alcohol of octyl/decyl glycidyl ether and polytetrahydrofurane bis(3-aminopropyl) terminated. IR: (cm$^{-1}$) 3429, 2925, 2855, 1465, 1376, 1252, 1113, 847, 746, 722.

Lube Properties of Base Stock

The viscosity of the product at 100° C. was 16 cSt and at 40° C. was 140 cSt with a viscosity index (VI) of 121. The pour point of the product was −39° C. The data was compared with PAO 10 as a control. The viscometric data of the product suggest that the fluid has excellent lubricant properties that are comparable to PAO. Results are set forth in Table 7 below.

TABLE 7

(Lube Properties of Base Stocks of Example 5 and Control)

| Sample # | $Kv_{100}$ | $Kv_{40}$ | Viscosity Index (VI) | Pour Point (° C.) |
|---|---|---|---|---|
| Example 5 | 16 | 140 | 121 | −39 |
| PAO10 | 10 | 66 | 137 | −48 |

Friction Coefficients of Base Stock

The friction coefficient of the product base stock was measured using a HFRR (high frequency reciprocating rig) test. The friction coefficient of the product was 0.044, while the friction coefficient of the 10 cSt PAO (control) under same measurement conditions was 0.13. This substantially difference in friction coefficient reflects the energy efficiency of the base stock. The results are set forth below in Table 8.

TABLE 8

(Friction Coefficient of Base Stocks of Example 5 and Control)

| Sample # | Friction Coefficient (FC) |
|---|---|
| Example 5 | 0.044 |
| PAO 10 | 0.13 |

Example 6

Synthesis of Polyether-Containing Epoxy-Amine Polymer from $C_8/C_{10}$ Glycidyl Ether and Poly (propylene glycol)-block-poly(ethylene glycol)-block-poly(propylene glycol) bis(2-aminopropyl ether) (Jeffamine® D-600)

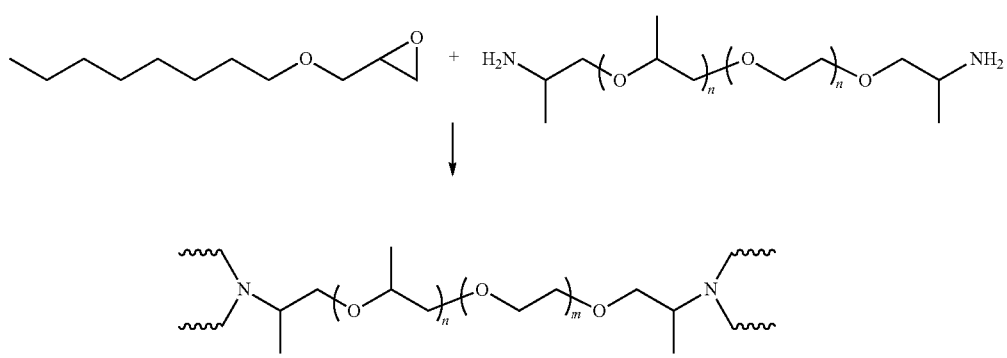

Octyl/decyl glycidyl ether (68 grams, 0.190 mol) and Jeffamine® D-600 (25 grams, 0.042 mol) were charged in a 500 ml round bottom flask with 50 ml of ethanol. The reaction mixture was refluxed overnight with stirring. After cooling, the low boiling ethanol was removed with a rotary evaporator and the high boiling excess of ocyl/decyl glycidyl ether with an air bath oven was removed at 200° C. under vacuum. The final product was colorless, and the product yield was 64 grams (69%). The product IR analysis suggests the formation of a tetra amino alcohol of ocyl/decyl glycidyl ether and Jeffamine® D-600. IR: (cm$^{-1}$) 3444, 2922, 2847, 1463, 1369, 1345, 1247, 1296, 993, 945, 743, 724.

Lube Properties of Base Stock

The viscosity of the product at 100° C. was 23.9 cSt and at 40° C. was 209.2 cSt with a viscosity index (VI) of 142. The pour point of the product was −42° C. The data were compared with that of PAO 10 in Table 9 below. The viscometric data of the product suggest that the fluid has excellent lubricant properties that are comparable to PAO.

TABLE 9

(Lube Properties of Base Stocks in Example 6 and Control)

| Sample # | $Kv_{100}$ | $Kv_{40}$ | Viscosity Index (VI) | Pour Point (° C.) |
|---|---|---|---|---|
| Example 6 | 23.9 | 209.2 | 142 | −42 |
| PAO10 | 10 | 66 | 137 | −48 |

Friction Coefficients of Base Stock

The friction coefficient of the product base stock was measured using a HFRR (high frequency reciprocating rig) test. The friction coefficient of the product was 0.073, while the friction coefficient of 10 cSt PAO under same measurement conditions was 0.13. This substantially difference in friction coefficient reflects the energy efficiency of the base stock.

TABLE 10

(Friction Coefficient of Base Stocks in Example 6 and Control)

| Sample # | Friction Coefficient (FC) |
|---|---|
| Example 6 | 0.073 |
| PAO 10 | 0.13 |

Example 7

Synthesis of Polyether-Containing Epoxy-Amine Polymer from Octyl/Decyl Glycidyl Ether and Jeffamine® D-230

Octyl/decyl glycidyl ether (246 grams, 1.230 mol) and Jeffamine® D-230 (69 grams, 0.3 mol) were charged in 500 ml round bottom flash with 150 ml ethanol. The reaction mixture was refluxed overnight with stirring. After cooling, the low boiling ethanol was removed with a rotary evaporator at 85° C. and the high boiling excess of octyl/decyl glycidyl ether was removed with an air bath oven at 180° C. under 1 mm vacuum. The final light yellow product yielded 300 grams (~97%). The product IR analysis suggests the formation of tetra amino alcohol of octyl/decyl glycidyl ether and Jeffamine® D-230. IR: ($cm^{-1}$) 3432, 2926, 2855, 1465, 1376, 1342, 1272, 1116, 722.

Lube Properties of Base Stock

The kinematic viscosity (Kv) of the liquid product was measured using ASTM D-445. The viscosity of the product at 100° C. was 18.8 cSt and at 40° C. was 250 cSt with a viscosity index (VI) of 82. The pour point of the product was −36° C. The data were compared with PAO 10 as a control and the results set forth in Table 11 below. The viscometric data of the product suggest that the fluid has excellent lubricant properties that are comparable to PAO.

TABLE 11

(Properties of Base Stocks of Example 7 and Control)

| Sample # | $Kv_{100}$ | $Kv_{40}$ | Viscosity Index (VI) | Pour Point (° C.) |
|---|---|---|---|---|
| Example 7 | 18.8 | 250 | 82 | −36 |
| PAO10 | 10 | 66 | 137 | −48 |

Friction Coefficients of Base Stock

The friction coefficient of the product base stock was measured using a HFRR test. The friction coefficient of the product was 0.11, while the friction coefficient of 10 cSt PAO under same measurement conditions was 0.13. This substantially difference in friction coefficient reflects the energy efficiency of the base stock. Results are set forth below in Table 12.

TABLE 12

(The Friction Coefficient of Base Stocks of Example 7 and Control)

| Sample # | Friction Coefficient (FC) |
|---|---|
| Example 7 (25872-006) | 0.11 |
| PAO 10 | 0.13 |

Example 8

Synthesis of Polyether-Containing Epoxy-Amine Polymer from Octyl/Decyl Glycidyl Ether and Jeffamine® D-230

Octyl/decyl glycidyl ether (267.4 grams, 1.337 mol) and Jeffamine® D-230 (75 grams, 0.326 mol) were charged in a 500 ml round bottom flash with 150 ml ethanol. The reaction mixture was refluxed overnight with stirring. After cooling, the low boiling ethanol was removed with a rotary evaporator at 85° C. and the high boiling excess of octyl/decyl glycidyl ether was removed with an air bath oven at 180° C. under a 1 mm vacuum. The final light yellow product yielded 335 grams (100%). The product IR analysis suggests the formation of a tetra amino alcohol of octyl/decyl glycidyl ether and Jeffamine® D-230. IR: ($cm^{-1}$) 3431, 2926, 2856, 1465, 1375, 1341, 1271, 1116, 865, 722.

Lube Properties of Base Stock

The kinematic viscosity (Kv) of the liquid product was measured using ASTM D-445. The viscosity of the product at 100° C. was 20.1 cSt and at 40° C. was 276 cSt with a viscosity index (VI) of 82. The data was compared with PAO 10 as a control and the results set forth in Table 13. The viscometric data of the product suggest that the fluid has good lubricant properties that are comparable to PAO.

TABLE 13

(Properties of Base Stocks of Example 8 and Control)

| Sample # | $Kv_{100}$ | $Kv_{40}$ | Viscosity Index (VI) | Pour Point (° C.) |
|---|---|---|---|---|
| Example 8 | 20.1 | 276 | 82 | −48 |
| PAO10 | 10 | 66 | 137 | −48 |

Friction Coefficients of Base Stock

The friction coefficient of the product base stock was measured using a HFRR test. The friction coefficient of the product was 0.11 while, the friction coefficient of 10 cSt PAO under same measurement conditions was 0.13. This substantial difference in friction coefficient reflects the energy efficiency of the base stock.

TABLE 14

(The Friction Coefficient of Base Stocks of Example 8 and Control)

| Sample # | Friction Coefficient (FC) |
|---|---|
| Example 8 (25872-013) | 0.11 |
| PAO 10 | 0.13 |

Example 9

The Synthesis of Polyether-Containing Epoxy-Amine Polymer from $C_{20}$-Epoxy and Jeffamine® D-400

$C_{20}$-epoxy (11.84 grams, 0.04 mol) and Jeffamine® D-400 (4.0 grams, 0.01 mol) were charged in a 200 ml round-bottomed flask with 40 mL of ethanol. The reaction mixture was refluxed overnight with stirring. After cooling, the low boiling ethanol was removed with a rotary evaporator and the high boiling unreacted $C_{20}$-epoxy was removed with an air bath oven at 160° C. to 170° C. under vacuum. The final yellow product yield was 5.92 grams (37%). The product IR, NMR and MS analysis suggests the formation of mono- and di-amino alcohol of $C_{20}$-epoxy and Jeffamine® D-400. IR: (cm$^{-1}$) 3458, 3360, 2927, 2837, 1468, 1374, 1110, 898, 720 NMR: ($^1$H δCDCl$_3$) 0.888 (CH$_3$, s), 1.014 (CH$_3$, s), 1.264 (—CH$_2$—, m), 2.51-2.90 (CH$_2$, s), 3.492 (—CH$_2$—O, CH—O), 1.99 (NH s) MS: (m/z) 1131 1015, 893, 835, 777, 719, 661.

Lube Properties of Base Stock

The kinematic viscosity (Kv) of the liquid product was measured using ASTM standard D-445 and reported at temperatures of 100° C. (Kv at 100° C.) or 40° C. (Kv at 40° C.). The viscosity index (VI) was measured according to ASTM standard D-2270 using the measured kinematic viscosities for each product. The viscosity of the product at 100° C. was 4.6 cSt and at 40° C. was 22.7 cSt with a viscosity index (VI) of 120. The data suggest the lubricant properties of the product are comparable to PAO4 base stock (control). The results are set forth below in Table 15.

TABLE 15

(Lube Properties of Base Stocks in Example 9 and Control)

| Sample # | Kv$_{100}$ | Kv$_{40}$ | Viscosity Index (VI) | Pour Point (° C.) |
|---|---|---|---|---|
| Example 9 | 4.6 | 22.7 | 120 | −51 |
| PAO 4 | 4.1 | 19 | 126 | −66 |

Friction Coefficients of Base Stock

The friction coefficient of the product base stock was measured using a HFRR (high frequency reciprocating rig) test. The friction coefficient of the product was 0.11 while the friction coefficient of 4 cSt PAO (control) under same measurement conditions was 0.22. This substantially difference in friction coefficient reflects the energy efficiency of the base stock. Results are set forth in Table 16.

TABLE 16

(Friction Coefficient of Base Stocks of Example 9 and Control)

| Sample # | Friction Coefficient (FC) |
|---|---|
| Example 9 | 0.11 |
| PAO 4 | 0.22 |

The epoxy-amine based polyether material was found to be very good base stock. The fluid was found to be soluble in other base stocks such as poly-α-olefins, Group III+ type fluids (Visom, GTL, etc) and Group I-III base stocks.

Blending Studies

The results of blending studies of the product of Example 9 and PAO 4 are shown below in Example 10 and Table 17.

Example 10

Blending Studies of Example 9 with PAO4

TABLE 17

(Blending Studies of the Product of Example 9 and PAO4 Control)

| | Product Example 9 | Product Ex. 9: PAO4 | Product Ex. 9: PAO4 | Product Ex. 9: PAO4 | Product Ex. 9: PAO4 | PAO4 |
|---|---|---|---|---|---|---|
| Blend Composition | 100 | 50 | 20 | 10 | 5 | 100 |
| Kv100 cSt | 4.6 | 4.2 | 4.1 | 4.1 | 4.1 | 4.1 |
| Kv40 cSt | 22.7 | 19.6 | 18.6 | 18.4 | 18.3 | 19 |
| VI | 120 | 120 | 124 | 127 | 128 | 126 |
| PP (° C.) | −51 | | | | | −66 |

Example 11

The Synthesis of Polyether-Containing Epoxy-Amine Polymer from $C_{20}$-Epoxy and Jeffamine® D-230

A mixture of $C_{20}$-epoxy (20.00 grams, 0.067 mol), Jeffamine® D-230 (4.47 grams, 0.019 mol) and absolute ethanol (60 ml) was heated in a 250 ml round-bottomed flask at reflux for 48 hours. The yellow solution was cooled to room temperature and concentrated on a rotary evaporator followed by heating in an air bath oven at 160° C. to 170° C. under vacuum to remove high-boiling unreacted $C_{20}$-epoxy. The product was a yellow oil, and the product yield was 16.0 grams (65%).

Lube Properties of Base Stock

The viscosity of the product at 100° C. was 8.2 cSt and at 40° C. was 76.5 cSt with a viscosity index (VI) of 72. The pour point of the product was −45° C. The data suggest that the lubricant properties of the product are comparable to PAO10 base stock (control). The results are set forth below in Table 18.

TABLE 18

(Lube Properties of Example 11 and Control)

| Sample # | Kv$_{100}$ | Kv$_{40}$ | Viscosity Index (VI) | Pour Point (° C.) |
|---|---|---|---|---|
| Example 11 | 8.2 | 76.5 | 72 | −45 |
| PAO10 | 10 | 66 | 137 | −48 |

Friction Coefficients of Base Stock

The friction coefficient of the product base stock was measured using a HFRR (high frequency reciprocating rig) test. The friction coefficient of the product was 0.10, while the friction coefficient of a 10 cSt PAO (control) under same measurement conditions was 0.13. This difference in friction coefficient reflects the energy efficiency of the base stock. Results are set forth in Table 19.

TABLE 19

(Friction Coefficients of Example 11 and Control)

| Sample # | Friction Coefficient (FC) |
|---|---|
| Example 11 | 0.10 |
| PAO 10 | 0.13 |

Example 12

Synthesis of Polyether-Containing Epoxy-Amine Polymer from $C_{20}$-Epoxy and Jeffamine® D-400

$C_{20}$-epoxy (65 grams, 0.22 mol) and Jeffamine® D-400 (80 grams, 1.0 mol) were charged in a 500 ml round-bottom flask with 40 ml ethanol. The reaction mixture was refluxed overnight with stirring. After cooling, the low boiling ethanol was removed with a rotary evaporator and the high boiling unreacted $C_{20}$-epoxy was removed with an air bath oven at 180° C. under a 1 mm vacuum. The final yellow product yield was 109 grams (78%). The product IR suggests the formation of an amino alcohol of a $C_{20}$-epoxy and Jeffamine® D-400. IR: ($cm^{-1}$) 3371, 2961, 2926, 2855, 1462, 1362, 1299, 1111, 921, 720.

Lube Properties of Base Stock

The viscosity of the product at 100° C. was 5.8 cSt and at 40° C. was 31.9 cSt with a viscosity index (VI) of 125. The pour point of the product was −48° C. The data suggest that the lubricant properties of the product are comparable to PAO4 base stock (control). Results are set forth below in Table 20.

TABLE 20

(Lube Properties of Base Stocks of Example 12 and Control)

| Sample # | $Kv_{100}$ | $Kv_{40}$ | Viscosity Index (VI) | Pour Point (° C.) |
|---|---|---|---|---|
| Example 12 | 5.8 | 31.9 | 125 | −48 |
| PAO4 | 4.1 | 19 | 126 | −66 |

Friction Coefficients of Base Stock

The friction coefficient of the product base stock was measured using HFRR (high frequency reciprocating rig) test. The friction coefficient of the product was 0.13 while, the friction coefficient of 4 cSt PAO under same measurement conditions was 0.21. This substantial difference in friction coefficient reflects the energy efficiency of the base stock. Results are set forth in Table 21.

TABLE 21

(The Friction Coefficient of Base Stocks of Example 12 and Control)

| Sample # | Friction Coefficient (FC) |
|---|---|
| Example 12 (25872-07) | 0.13 |
| PAO 4 | 0.21 |

Example 13

Synthesis of Polyether-Containing Epoxy-Amine Polymer from $C_{20}$-Epoxy and Jeffamine® D-400

$C_{20}$-epoxy (97.88 grams, 0.33 mol) and Jeffamine® D-400 (120 grams, 0.30 mol) were charged in a 500 ml round-bottom flash with 50 ml ethanol. The reaction mixture was refluxed overnight with stirring. After cooling, the low boiling ethanol was removed with a rotary evaporator and the high boiling unreacted $C_{20}$-epoxy was removed with an air bath oven at 180° C. under a 1 mm vacuum. The final product was yellow, and the product yield was 173 grams (83%). The product IR suggests the formation of an amino alcohol of $C_{20}$-epoxy and Jeffamine® D-400. IR: ($cm^{-1}$) 3369, 290, 2925, 2855, 1591, 1460, 1378, 1374, 1345, 1299, 1110, 1018, 922, 722

Lube Properties of Base Stock

The viscosity of the product at 100° C. was 5.4 cSt and at 40° C. was 30.2 cSt with a viscosity index (VI) of 113. The pour point of the product was −54° C. The data suggest that the lubricant properties of the product are comparable to PAO 4 base stock (control). The results are set forth below in Table 22.

TABLE 22

(Lube Properties of Base Stocks of Example 13 and Control)

| Sample # | $Kv_{100}$ | $Kv_{40}$ | Viscosity Index (VI) | Pour Point (° C.) |
|---|---|---|---|---|
| Example 13 | 5.4 | 30.2 | 113 | −54 |
| PAO4 | 4.1 | 19 | 126 | −66 |

Example 14

The Synthesis of Polyether-Containing Epoxy-Amine polymer from Poly (Ethylene Glycol) Diglycidyl Ether and Dioctylamine A mixture of poly (ethylene glycol) diglycidyl ether (25 grams, 0.0475 mol), dioctylamine (24 grams, 0.0998 mol) and ethanol (25 ml) was heated at reflux in a 250 ml round-bottom flask for 18 hours. The solution was cooled to room temperature and concentrated on a rotary evaporator to remove the low boiling ethanol followed by heating in an air bath over at 200° C. under a 1 mm vacuum to remove excess dioctylamine. The solution was washed with 50 ml water to remove unreacted poly(ethylene glycol) diglycidyl ether. The product was of a light yellow color, and product yield was 46 grams (96%). The product IR analysis suggests the formation of a tetra alkyl amino alcohol of poly (ethylene glycol) diglycidyl ether and dioctylamine. IR: ($cm^{-1}$) 3454, 2922, 2851, 1468, 1345, 1289, 1247, 1110, 1044, 941, 865, 724.

Lube Properties of Base Stock

The viscosity of the product at 100° C. was 13.3 cSt and at 40° C. was 87.4 cSt with a viscosity index (VI) of 154. The pour point of the product was −45° C. The data was compared with PAO 10 (control) and set forth in Table 1 below. Thus, the viscometric data of the product suggest that the fluid has excellent lubricant properties that are comparable to PAO. Results are set forth below in Table 23.

TABLE 23

(Lube Properties of Base Stocks of Example 14 and Control)

| Sample # | $Kv_{100}$ | $Kv_{40}$ | Viscosity Index (VI) | Pour Point (° C.) |
|---|---|---|---|---|
| Example 14 | 13.3 | 87.4 | 154 | −45 |
| PAO10 | 10 | 66 | 137 | −48 |

Friction Coefficients of Base Stock

Lubricant fuel/energy efficiency has been identified as a critical feature for future premium lubricants. To provide step-out fuel economy while maintaining or improving other performance features for lubricants, base stocks with lower friction coefficients are needed. The friction coefficient of the product base stock was measured using a HFRR (high frequency reciprocating rig) test. The friction coefficient of the product was 0.09, while the friction coefficient of a 10 cSt PAO (control) under same measurement conditions was 0.13. This substantial difference in friction coefficient reflects the energy efficiency of the base stock. Results are set forth below in Table 24.

TABLE 24

(Friction Coefficient of Base Stocks of Example 14 and Control)

| Sample # | Friction Coefficient (FC) |
| --- | --- |
| Example 14 | 0.09 |
| PAO 10 | 0.13 |

Example 15

Synthesis of Polyether Containing Epoxy-Amine Polymer from Poly (Propylene Glycol) Diglycidyl Ether and Dioctylamine Poly (propylene glycol) diglycidyl ether (50.54 g, 0.133 mol) and dioctylamine (67.3 g, 0.279 mol) were charged in a 500 ml round-bottom flask with 25 ml ethanol. The reaction mixture was refluxed overnight with stirring. After cooling, the low boiling ethanol was removed with a rotary evaporator at 85° C. and the high boiling excess of dioctylamine was removed with an air bath oven at 185° C. under a 1 mm vacuum. The final product was a light yellow color, and the product yield was 73.4 grams (98%). The product IR analysis suggests the formation of a tetra alkyl amino alcohol of poly (propylene glycol) diglycidyl ether and dioctylamine. IR: ($cm^{-1}$) 3436, 2926, 2855, 1466, 1376, 1109, 724.

Lube Properties of Base Stock

The viscosity of the product at 100° C. was 10.2 cSt and at 40° C. was 86.1 cSt with a viscosity index (VI) of 100. The pour point of the product was −45° C. The data was compared with PAO 10 (control) and set forth in Table 25 below. The viscometric data of the product suggest that the fluid has excellent lubricant properties that are comparable to PAO.

TABLE 25

(Lube Properties of Base Stocks of Example 15 and Control)

| Sample # | $Kv_{100}$ | $Kv_{40}$ | Viscosity Index (VI) | Pour Point (° C.) |
| --- | --- | --- | --- | --- |
| Example 15. | 10.2 | 86.1 | 100 | −45 |
| PAO10 | 10 | 66 | 137 | −48 |

Friction Coefficients of Base Stock

The friction coefficient of the product base stock was measured using a HFRR (high frequency reciprocating rig) test. The friction coefficient of the product was 0.11, while the friction coefficient of 10 cSt PAO under the same measurement conditions was 0.13. This difference in friction coefficient reflects the energy efficiency of the base stock. Results are set forth in Table 26 below.

TABLE 26

(Friction Coefficient of Base Stocks of Example 15 and Control)

| Sample # | Friction Coefficient (FC) |
| --- | --- |
| Example 15. | 0.11 |
| PAO 10 | 0.13 |

Example 16

Synthesis of Polyether-Containing Epoxy-Amine Polymer from Poly (Propylene Glycol) Diglycidyl Ether and Dioctylamine Poly (propylene glycol) diglycidyl ether (150 grams, 0.395 mol) and dioctylamine (200 grams, 0.829 mol) were charged in a 500 ml round-bottom flask with 200 ml ethanol. The reaction mixture was refluxed overnight with stirring. After cooling, the low boiling ethanol was removed with a rotary evaporator at 85° C. and the high boiling excess of dioctylamine was removed with an air bath oven at 185° C. under a 1 mm vacuum. The final product was of a light yellow color, and the yield was 340 grams (99.9%). The product IR analysis suggests the formation of a tetra alkyl amino alcohol of poly (propylene glycol) diglycidyl ether and dioctylamine. IR: ($cm^{-1}$) 3447, 2925, 2855, 1465, 1376, 1110, 933, 746, 722.

Lube Properties of Base Stock

The viscosity of the product at 100° C. was 10.9 cSt and at 40° C. was 87 cSt with a viscosity index (VI) of 112. The pour point of the product was −48° C. The data was compared with PAO 10 (control). The viscometric data of the product suggests that the fluid has excellent lubricant properties comparable to PAO. Results are set forth in Table 27 below.

TABLE 27

(Lube Properties of Base Stocks of Example 16 and Control)

| Sample # | $Kv_{100}$ | $Kv_{40}$ | Viscosity Index (VI) | Pour Point (° C.) |
| --- | --- | --- | --- | --- |
| Example 16. | 10.9 | 87 | 112 | −48 |
| PAO10 | 10 | 66 | 137 | −48 |

Friction Coefficients of Base Stock

The friction coefficient of the product base stock was measured using HFRR (high frequency reciprocating rig) test. The friction coefficient of the product was 0.11 while, the friction coefficient of 10 cSt PAO under same measurement conditions was 0.13. This substantial difference in friction coefficient reflects the energy efficiency of the base stock. The results are set forth below in Table 28.

TABLE 28

(The Friction Coefficient of Base Stocks of Example 16 and Control)

| Sample # | Friction Coefficient (FC) |
| --- | --- |
| Example 16 (25872-14) | 0.11 |
| PAO 4 | 0.13 |

Epoxide-terminated hydrocarbon molecules (glycidyl ethers containing varying alkyl groups) can be reacted with polyether amines to obtain low molecular weight fluids that can be used as synthetic base stock. For example, glycidyl ether ($C_8/C_{10}$) can be reacted with polytetrahydrofuran-based Jeffamine® (MW of 350) to obtain a liquid product that had excellent lube properties.

The reaction of amine-terminated polyethers and epoxides can be carried out neat or in solvents like THF, MEK or ethanol. The temperature of the reaction can be 25° C. to 60° C. or higher. The reaction time can be a few hours to few days.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. Likewise, the term "comprising" is considered synonymous with the term "including" for purposes of Australian law.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. The invention has been described above with reference to numerous embodiments and specific examples. Many variations will suggest themselves to those skilled in this art in light of the above detailed description. All such obvious variations are within the full intended scope of the appended claims.

What is claimed is:

1. A block copolymer, comprising:
   an "A" block of a functionalized hydrocarbon moiety including one or more functional end groups selected from the group consisting of: epoxides, amines, acids, acid chlorides, acid anhydrides, halogens, vinyl or vinylidene double bonds, aromatic rings and thiols; and
   a "B" block of a functionalized polyether moiety including one or more functional end groups selected from the group consisting of epoxides, amines, acids, acid chlorides, acid anhydrides, halogens, vinyl or vinylidene double bonds, aromatic rings and thiols,
   wherein the end group of the polyether moiety is different than the end group of the hydrocarbon moiety, wherein the hydrocarbon moiety and the polyether moiety are copolymerizable therewith.

2. The copolymer of claim 1, wherein said hydrocarbon moiety is a poly-α-olefin and said polyether moiety is a polyalkylene glycol.

3. The copolymer of claim 2, wherein the polyalkylene glycol is difunctional and the poly-α-olefin is difunctional.

4. The copolymer of claim 3, wherein the polyalkylene glycol is a difunctional amine and the poly-α-olefin is a difunctional epoxide.

5. The copolymer of claim 4, wherein the polyalkylene glycol is a polyether amine.

6. The copolymer of claim 5, wherein the polyether amine is at least one amine selected from the group consisting of: poly(propyleneglycol) bis(2-aminopropylether), and poly(propyleneglycol) bis(2-atninopropylether).

7. The copolymer of claim 2, wherein the hydrocarbon moiety is an alkyl glycidyl ether, Armin amine or dioctylamine.

8. The copolymer of claim 1, comprising a diblock copolymer.

9. The copolymer of claim 1, comprising a repeating diblock copolymer.

10. The copolymer of claim 1, wherein the copolymer has an average molecular weight of 200 to 20000.

11. The copolymer of claim 10, wherein the copolymer has an average molecular weight of 250 to 5000.

12. A lubricant formulation, comprising:
    a first lubricant base stock comprising a block copolymer, said block copolymer comprising: an "A" block of a functionalized hydrocarbon moiety including one or more functional end groups selected from the group consisting of: epoxides, amines, acids, acid chlorides, acid anhydrides, halogens, vinyl or vinylidene double bonds, aromatic rings and thiols; and a "B" block of a functionalized polyether moiety including one or more functional end groups consisting of: epoxides, amines, acids, acid chlorides, acid anhydrides, halogens, vinyl or vinylidene double bonds, aromatic rings and thiols, wherein the end group of the polyether moiety is different than the end group of the hydrocarbon moiety, wherein the hydrocarbon moiety and the polyether moiety are copolymerizable therewith; and
    a second lubricant base stock different than the first base stock.

13. The lubricant formulation of claim 12, wherein the second base stock is selected from the group consisting of: metallocene poly-α-olefins, poly-α-olefins, a GTL, a Group I base stock, a Group II base stock, and a Group III base stock.

14. A process for making a block copolymer, comprising: copolymerizing an "A" block of a functionalized hydrocarbon moiety and a "B" block of a functionalized polyether moiety, wherein the functionalized hydrocarbon moiety includes one or more functional end groups selected from the group consisting of: epoxides, amines, acids, acid chlorides, acid anhydrides, halogens, vinyl or vinylidene double bond, aromatic rings and thiols, and wherein the functionalized polyether moiety includes one or more functional end groups selected from the group consisting of: epoxides, amines, acids, acid chlorides, acid anhydrides, halogens, vinyl or vinylidene double bond, aromatic rings and thiols, wherein the end group of the polyether moiety is different than the end group of the hydrocarbon moiety, and wherein the hydrocarbon moiety and the polyether moiety are copolymerizable therewith.

15. The process of claim 14, wherein said hydrocarbon moiety is a poly-α-olefin and said polyether moiety is a polyalkylene glycol.

16. The process of claim 14, wherein the copolymerization takes place at a temperature of 0° C. to 200° C.

17. The process of claim 16, wherein the copolymerization takes place at a temperature of 20° C. to 120° C.

18. The process of claim 14, wherein the copolymerization takes place for a time of 0.5 hours to 36 hours.

19. The process of claim 18, wherein the copolymerization takes place for a time of 1 hour to 2.4 hours.

20. A synthetic base stock composition comprising: a macromolecular fluid comprising:
- a functionalized hydrocarbon moiety including one or more functional end groups selected from the group consisting of: epoxides, amines, acids, acid chlorides, acid anhydrides, halogens, vinyl or vinylidene double bonds, aromatic rings and thiols having an average molecular weight within the range between 200 to 7000, said moiety comprising an alkyl or alkylene chain; and
- a functionalized polyether moiety including one or more functional end groups selected from the group consisting of: epoxides, amines, acids, acid chlorides, acid anhydrides, halogens, vinyl or vinylidene double bonds, aromatic rings and thiols having an average molecular weight within the range between 200 to 7000,
- wherein said hydrocarbon moiety provides hydrocarbon solubility to said macromolecular fluid and said polyether moiety imparts low friction coefficient to the material and wherein said hydrocarbon moiety and said polyether moiety are either linked to a bond other than a carbon to carbon bond or linked by a functional group so that the resultant macromolecular fluid is substantially amorphous, has a viscosity index of greater than 80, and a pour point of less than −20° C.

* * * * *